United States Patent
Strobl et al.

(10) Patent No.: US 10,442,540 B2
(45) Date of Patent: Oct. 15, 2019

(54) DEVICE AND METHOD FOR DEICING AND/OR PREVENTING ICE FORMATION AND PROFILE ELEMENT AND AIRCRAFT HAVING SUCH A DEVICE

(71) Applicant: Airbus Defence and Space GmbH, Ottobrunn (DE)

(72) Inventors: Tobias Strobl, Munich (DE); Stefan Storm, Unterschleissheim (DE); Dominik Raps, Neuburg (DE); Tobias Hauk, Unterhaching (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 0 days.

(21) Appl. No.: 14/539,491

(22) Filed: Nov. 12, 2014

(65) Prior Publication Data
US 2015/0129720 A1    May 14, 2015

(30) Foreign Application Priority Data
Nov. 13, 2013  (EP) .................................. 13005342

(51) Int. Cl.
*B64D 15/16* (2006.01)
*B64D 15/20* (2006.01)
*B64D 15/12* (2006.01)

(52) U.S. Cl.
CPC .......... *B64D 15/163* (2013.01); *B64D 15/12* (2013.01); *B64D 15/16* (2013.01); *B64D 15/20* (2013.01)

(58) Field of Classification Search
CPC ...... B64D 15/12; B64D 15/163; B64D 15/18; B64D 15/22; B64D 15/14; H05B 3/84; F25C 5/06; F01D 25/02
(Continued)

(56) References Cited

U.S. PATENT DOCUMENTS 4,021,008 A * 5/1977 Eichenauer ............ B64D 15/12
                                                244/134 D
5,921,502 A    7/1999 Ai-Khalil et al.
(Continued)

FOREIGN PATENT DOCUMENTS

CH    233496 A    7/1944
CN   1414919 A    4/2003
(Continued)

OTHER PUBLICATIONS

Al-Khalil "Effect of Mixed Icing Conditions on Thermal Ice Protection Systems" FAA Specialists' Workshop Mixed Phase and Glaciated Icing Conditions, Dec. 2-3, 1998, nine pages, Cox & Company, Inc., New York, NY 10014.
(Continued)

*Primary Examiner* — Medhat Badawi
*Assistant Examiner* — Vicente Rodriguez
(74) *Attorney, Agent, or Firm* — Crowell & Moring LLP (57) ABSTRACT

In order to maintain a surface region of an aircraft free of ice in a particularly energy-efficient manner, a device for deicing and/or for preventing ice formation is provided on an aircraft. The device includes a heat emitting device for emitting heat at a surface region of the aircraft, the heat emitting device is designed to dissipate heat along a line in order to produce a predetermined breaking point or a predetermined breaking line or parting line in ice accumulating on the surface region.

19 Claims, 4 Drawing Sheets

(58) Field of Classification Search
USPC .................................. 244/134 A, 134 D, 134
See application file for complete search history.

(56) References Cited

U.S. PATENT DOCUMENTS

| | | | | |
|---|---|---|---|---|
| 6,129,314 | A * | 10/2000 | Giamati | ................ B64D 15/00 |
| | | | | 244/134 A |
| 6,134,964 | A | 10/2000 | Jaenker et al. | |
| 6,283,411 | B1 | 9/2001 | Giamati et al. | |
| 6,411,009 | B2 | 6/2002 | Jaenker | |
| 6,702,233 | B1 | 3/2004 | DuPont | |
| 7,556,221 | B2 * | 7/2009 | Hindel | ................... B64D 15/12 |
| | | | | 219/202 |
| 7,880,366 | B2 * | 2/2011 | Grohmann | ................ B64C 3/48 |
| | | | | 310/328 |
| 8,793,970 | B2 | 8/2014 | Le Docte | |
| 2005/0280332 | A1 | 12/2005 | Ollila | |
| 2005/0285477 | A1 | 12/2005 | Ollila | |
| 2007/0045282 | A1 * | 3/2007 | Petrenko | .................. A63C 1/30 |
| | | | | 219/492 |
| 2008/0145528 | A1 * | 6/2008 | Deng | ....................... B05D 1/60 |
| | | | | 427/180 |
| 2008/0315725 | A1 | 12/2008 | Konstanzer et al. | |
| 2008/0316671 | A1 | 12/2008 | Kakehi et al. | |
| 2010/0206990 | A1 * | 8/2010 | Petrenko | .............. B64D 15/163 |
| | | | | 244/134 D |
| 2010/0314575 | A1 * | 12/2010 | Gao | ......................... C09K 3/18 |
| | | | | 252/70 |
| 2012/0091276 | A1 * | 4/2012 | Al-Khalil | ............... B64D 15/14 |
| | | | | 244/134 A |

FOREIGN PATENT DOCUMENTS

| | | |
|---|---|---|
| CN | 101835686 A | 9/2010 |
| DE | 2 203 642 A1 | 8/1972 |
| DE | 10 2010 045 450 B4 | 4/2013 |
| EP | 0 907 036 A2 | 4/1999 |
| EP | 0 658 478 B1 | 9/1999 |
| EP | 1 017 580 B1 | 8/2004 |
| EP | 1 963 704 B1 | 8/2010 |
| GB | 1 384 235 A | 2/1975 |
| WO | WO 01/49564 A1 | 7/2001 |
| WO | WO 2007/073820 A1 | 7/2007 |

OTHER PUBLICATIONS

Al-Khalil et al. "AIAA 97/0302 A Hybrid Anti-icing Ice Protection System" 35$^{th}$ Aerospace Sciences Meeting & Exhibit, Jan. 6-7, 1997, nine pages, Cox & Company, Inc., New York, NY.

Al-Khalil "Thermo-Mechanical Expulsion Deicing System-TMEDS" American Institute of Aeronautics and Astronautics Jan. 8-11, 2007, 13 pages, Cox and Company, Inc., New York, NY, 10014.

Fortin et al. "Experimental Study of Hybrid Anti-Icing Systems Combining Thermoelectric and Hydrophobic Coatings" Jun. 13, 2011, ten pages, SAE International.

German-language European Search Report dated Jun. 25, 2014, including partial English translation (six (6) pages).

Chinese Office Action issued in Chinese counterpart application No. 201410638704.1 dated Jan. 20, 2016, with partial English translation (Twelve (12) pages).

European Office Action issued in European counterpart application No. 13 005 342.4-1013 dated Oct. 15, 2018 (Five (5) pages).

* cited by examiner

FIG 7  Prior Art

DEVICE AND METHOD FOR DEICING AND/OR PREVENTING ICE FORMATION AND PROFILE ELEMENT AND AIRCRAFT HAVING SUCH A DEVICE

CROSS-REFERENCE TO RELATED APPLICATIONS

This application claims priority under 35 U.S.C. § 119 to European application 13 00 5342.4, filed Nov. 13, 2013, the entire disclosure of which is herein expressly incorporated by reference.

BACKGROUND AND SUMMARY OF THE INVENTION

Exemplary embodiments of the invention relate to a device for de-icing and/or for preventing ice formation for an aircraft, comprising a heat emitting device for emitting heat at a surface region of the aircraft. Furthermore, exemplary embodiments of the invention relate to an aerodynamic profile element for an aircraft, e.g. a wing or a part of a wing, an engine intake, or a fin of a tail, which is provided with such a device. In addition, exemplary embodiments of the invention relate to an aircraft having such a device and/or such a profile element. Finally, exemplary embodiments of the invention relate to a method for de-icing a surface region of an aircraft and/or for preventing the formation of ice on the surface region of the aircraft by introducing thermal energy at the surface region.

Ice forms at exposed locations of aircraft, such as front edges of wings, tails, horizontal stabilizers, or engine takes, when the aircraft, such as an airplane, flies through a cloud which contains super-cooled water droplets and/or when droplets/moisture strike a super-cooled aircraft structure. If a layer of ice grows, it impairs the airstream over the affected surface. If the layer becomes large enough, e.g. lift problems or handling problems for the aircraft can result.

Ice protection systems for aircraft are already in use in order to prevent such a formation of ice. Most ice protection systems are designed as anti-ice systems for preventing the formation of ice. Heating systems integrated in the structure are usually provided for this purpose. During flight in icing conditions, wing edges are heated, e.g. with hot bleed air or compressor bleed air, or are heated by electric heaters in the wing edges. In addition, pneumatically operated de-icing devices are used, primarily in smaller airplanes, which inflate rubber mats or rubber tubes integrated on the leading edge of the wing at regular intervals, thereby detaching ice that has accumulated.

In this connection, the conventional de-icing measures are associated with high energy expenditure during the flight. The energy expenditure required to free surfaces of aircraft from ice amounts to approximately 240 to 260 kW of bleed air power or approximately 130 to 150 kW of electric heat output for a surface area to be de-iced of approximately 12 to 15 m². In the case of bleed air, these data correspond to power per unit of surface of approximately 18.5 kW/m² or approximately 10 kW/m² for electric heat.

Known systems or devices for removing ice accumulations during flight on aerodynamically efficient surfaces can be generally subdivided into pneumatic, thermal, and mechanical de-icing systems. An exemplary device for the pneumatic de-icing of surfaces on aircraft is disclosed in European patent document EP 0 658 478 B1. US patent document U.S. Pat. No. 6,702,233 B1 discloses a device for de-icing or preventing the formation of ice on surface regions of aircraft using warm bleed air from the engine.

German patent document DE 10 2010 045 450 B4 discloses an arrangement for de-icing a surface region of an aircraft by irradiating the surface region with a laser.

Other devices for de-icing and/or for preventing the formation of ice employ thermal de-icing by using electric heating elements. It is known, in particular, to prevent the surface of a wing profile from icing by supplying heat to a large surface area by means of an electro-thermal heating mat. An example of such a thermal de-icing is described in European patent document EP 1 017 580 B1.

The method of operation of such known devices for de-icing and/or for preventing ice formation for an aircraft having is described in greater detail by reference to the depictions in FIGS. 6 and 7.

Figure 6:
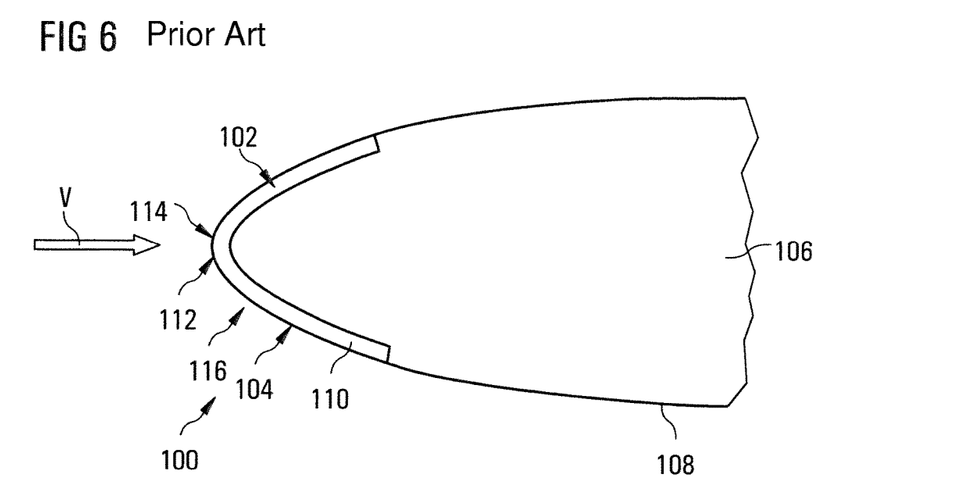
FIG. 6 shows a leading edge of a profile element comprising a known device for de-icing and/or for preventing the formation of ice, in a first operating mode.
Figure 7:
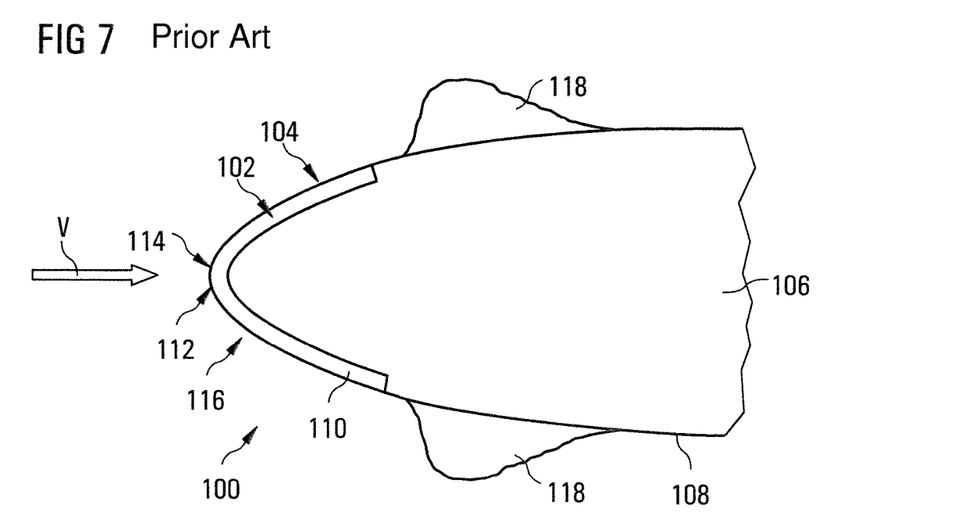
FIG. 7 shows a depiction comparable to FIG. 6, wherein the known device is operated in a further operating mode.

FIGS. 6 and 7 show an aerodynamic profile element 108, for example a wing of an aircraft designed as an airplane, which comprises a known device 100 for de-icing and/or for preventing the formation of ice. The device 100 is provided with a heat emitting device 102 for emitting heat at a surface region 104 of the aircraft 106. The heat emitting device 102 comprises a heating mat 110, which is disposed over a large surface area of the surface region 104 and heats the entire surface region 104. It is thereby possible, for example, to maintain the entire surface region 104 located around the leading edge 112 or around a stagnation line 114 free of ice.

FIG. 6 shows a schematic diagram of a fully evaporative, electro-thermal de-icing system 116 as an example of the known device 100 for de-icing and/or for preventing the formation of ice, said de-icing system 116 being provided with a heating mat 110 in the region of the leading edge 112 of a wing in order to totally prevent ice accumulation over a large surface area by water droplets striking the surface of the wing profile.

By supplying heat over a large surface area using the electro-thermal heating mat 110, the surface of the wing profile can be prevented from icing in the following two ways. It is hereby assumed that the electro-thermal de-icing system 116 is operated permanently:

As depicted in FIG. 6, the water droplets striking the wing profile—profile element 108—are completely evaporated in the fully evaporative de-icing mode.

As depicted in FIG. 7, the adhesion and solidification of water droplets to form ice accumulations on the leading edge 112 of the profile of the profile element 108 are prevented by means of a "running-wet" de-icing mode. The surface temperature of the leading edge 112, which results from the heating by means of this de-icing mode, is lower than in the fully evaporative de-icing mode. As a result, the solidification of the impinging water droplets to form ice is initially prevented on the heated wing leading edge 112. The water droplets run along the wing profile of the profile element 108 in the direction of the trailing profile edge and solidify in less critical, unheated regions on the wing profile to form ice 118.

In the known electro-thermal de-icing systems 116, it is therefore necessary to either apply very large amounts of energy in order to implement the fully evaporative de-icing mode or, if lesser amounts of energy are used, ice forms on less critical, non-heated regions.

Furthermore, devices for de-icing and/or for preventing the formation of ice are also known that are hybrid devices offering a plurality of possibilities for de-icing, in particular such as the use of thermal energy and mechanical deformation. Examples of known hybrid de-icing systems are known from the following references:

G. Fortin, M. Adomou, J. Perron, "Experimental Study of Hybrid Anti-Icing Systems Combining Thermoelectric and Hydrophobic Coatings", SAE International, Warrendale, Pa., 2011: This publication discusses an electro-thermal anti-icing system in combination with ice-repellent surface coatings for reducing the amount of energy required for de-icing. In this system, heat is supplied over a large surface area in order to protect the entire surface affected by ice accumulation. The disadvantage of the system, therefore, is the fact that the permanent operation of the anti-icing system—which must be installed over a large surface area—in the region of the entire leading edge of the wing invariably results in high energy consumption.

US patent documents U.S. Pat. No. 5,921,502 and US 2012/0091276 A1, as well as K. Al-Khalil, T. Ferguson, D. Phillips, "A Hybrid Anti-icing Ice Protection System", AIAA 97-0302 (1997): These publications discuss a hybrid de-icing system from Cox & Company, Inc., which consists of a thermal "running-wet" anti-icing subsystem and a subsystem based on electro-expulsive actuators (EMEDS). The thermal subsystem covers the region of the droplet impact on the leading edge of the wing across a large surface area, either partially or completely. The thermal subsystem therefore has the disadvantage that a relatively large surface portion of the leading edge region of the wing must be heated in order to transport the water droplets further downstream. There, the droplets that have solidified to form ice accumulation can be periodically removed by means of the EMEDS actuators. A further disadvantage of the known hybrid system is the size of the EMEDS actuators. The de-icing system comprising EMEDS actuators has a particularly disadvantageous effect on the electromagnetic compatibility with other systems and components of an aircraft, since very high currents are briefly required for the pulse triggering of the actuators. Moreover, these briefly required, very high currents require a so-called 'Energy Storage Bank' (ESB), the weight of which has an extremely disadvantageous effect on the aircraft to be de-iced.

In the case of the de-icing system known from US patent document U.S. Pat. No. 6,283,411 B1 as well, a large surface-area thermal heater is combined with a voluminous and heavy mechanical actuator.

Reference is furthermore made to the technological background of the following documents [1] and [2]:

[1] K. Al-Khalil, Effect of Mixed Icing Conditions on Thermal Ice Protection Systems, [Apr. 15, 2013], http://www.coxandco.com/files/pdf/FAA-D9688.pdf.

[2] K. Al-Khalil, Thermo-Mechanical Expulsion De-icing System—TMEDS, [Apr. 15, 2013], http://www.coxandco.com/files/pdf/AIAA-2007-0692.pdf.

In general, all the known systems require that substantially high amounts of energy be used for de-icing or to prevent the formation of ice.

Exemplary embodiments of the present invention therefore are directed to a device and a method for de-icing and/or for preventing the formation of ice, with which de-icing and/or prevention of the formation of ice can be carried out using lesser amounts of energy.

In accordance with exemplary embodiments of the present invention an aerodynamic profile element that is provided with such a device, such as, for example, a part of an airfoil or a fin or an engine intake of an aircraft, and an aircraft provided with such a device or such a profile element.

According to a further aspect, exemplary embodiments of the invention involve a method for de-icing and/or for preventing ice formation for an aircraft.

One advantage of the invention is that a device and a method for de-icing a surface region of an aircraft and/or for preventing the formation of ice on the surface region of the aircraft are created by the targeted introduction of thermal energy into a defined surface region.

A particular advantage of preferred embodiments of the invention is the creation of a device and a method for de-icing and/or for preventing the formation of ice, with which de-icing and/or prevention of the formation of ice is made possible such that electromagnetic compatibility of the de-icing device and the systems of the aircraft is ensured. A substantial advantage of such embodiments as compared to known systems is that briefly high currents for pulse triggering of the surface of a profile element to be de-iced are not required.

According to a first aspect, the invention creates a device for de-icing and/or for preventing ice formation for an aircraft, the device comprises a heat emitting device for the targeted emission of heat at a defined surface region of the aircraft, wherein the heat emitting device is designed to emit heat along the shape of a line in order to produce a predetermined breaking point or a predetermined breaking line in ice accumulating on the surface region.

The heat emitting device is preferably designed such that it emits heat in a defined line-shaped heat emission region having a line width in the range of 0.2 mm to 4 mm, preferably 0.5 mm to 1.5 mm and, most preferably, approximately 1.0 mm or approximately 0.8 mm or in the range of approximately 0.8 mm to approximately 1.0 mm.

The line-shaped heat emission region preferably extends, via the longitudinal direction thereof, along the stagnation point line of a profile element of the aircraft to be de-iced or to be maintained free of ice. The stagnation point line is preferably located substantially in the center within the line-shaped heat emission region.

Preferably, the attachment of the heat emitting device on the inner side of the surface of the profile body is implemented by a materially bonded connection, in particular an adhesive bond. In a preferred design, the connection, such as the adhesive bond, in particular, has a length about the stagnation point of the profile element in the range between 0.5 mm and 1.5 mm, and, in an explicitly good design, a length of 0.8 mm. In a preferred design, the thickness of the adhesive bond is 0.2 mm.

Preferably, the heat emitting device has a preferably line-shaped heat source. The heat source is preferably enclosed by an insulating jacket in order to reduce or prevent heat from radiating into the interior of the profile element. In a preferred design, the insulating jacket is made of Kapton, for example, which has low thermal conductivity and therefore has a good insulating effect. In an alternative design, the insulating jacket can also be made of another highly thermally insulating material or a plurality of various highly thermally insulating materials. Moreover, the insulating jacket of the heat source enables the heat emission to be bundled inside the jacket, thereby allowing the heat to be introduced into the surface of the profile element in the shape of a line. The effect of the heat buildup that is produced as a result also serves to reduce energy consumption. The insulating jacket preferably comprises a line-shaped opening for the formation of the heat emission line.

The device is preferably designed as a hybrid device for de-icing and/or for preventing the formation of ice by means of thermal and mechanical energy.

A preferred embodiment of the device comprises a deformation device for the deformation of at least one part of the surface of the surface region.

Preferably, the heat emitting device comprises at least one preferably elongated heat source and an insulating jacket for the heat source for preventing heat radiation at region other than the heat emission line.

The deformation device preferably comprises at least one piezoelectric actuator or an arrangement of piezoelectric actuators for deforming a surface of the surface region.

In a further preferred embodiment, the deformation device can comprise at least one inertial force generator or an inertial mass oscillator. The inertial force generator or the inertial mass oscillator can be provided in addition or as an alternative to the at least one piezoelectric actuator.

The heat emitting device preferably contains an insulating jacket, which prevents heat from the heat source, for example the heating wire that rides out in a planar manner from radiating into the surface of the profile element.

Preferably, the heat emitting device contains an insulating jacket, which prevents the heat emitted by the heating wire from radiating into the interior of the profile element and thereby ensures a buildup of heat that is introduced into the surface of the profile element in the shape of a line.

An ice detection device is preferably provided, which is designed to detect an accumulation of ice on the basis of information received by the heat emitting device and/or by at least one actuator.

The at least one piezoelectric actuator is preferably designed as a $d_{33}$ stack actuator.

The extension direction of the at least one actuator, in particular of the at least one piezoelectric actuator, is preferably oriented in the wingspan direction when used on a profile of a wing. In particular, the extension direction is oriented with at least one directional component in the direction of the heat emission line.

Preferably, the piezoactuators and/or the heating wire or the heating element can be used to detect ice accumulations on the surface. A detection device, in particular, is provided for this purpose, which can detect whether an accumulation of ice is present on the basis of parameters obtained with these elements.

The heat emitting device of the device according to the invention is designed to emit heat along the shape of a line in order to thereby produce a predetermined breaking point or a predetermined breaking line in ice accumulating on the surface region. The heat emitting device is therefore designed to emit heat along a heat emission line. Depending on the energy input, ice located on the heat emission line weakens along said heat emission line, thereby enabling the ice to be fractured, or no ice forms at all along the heat emission line, with the result that, at best, ice can form on sections of the surface region that are separated by the heat emission line. In this connection, the heat emission line preferably has the shortest possible extension in the width direction. The line widths should be a maximum of, e.g. 5 mm, although a substantially narrower heat emission line in the range of 0.2 mm to 3 mm is preferable, and more preferably is in the range of 0.5 mm to 1.5 mm and, most preferably, is approximately 0.8 mm. Heat is emitted in a targeted manner along the shape of a line having a minimal width extension. It is sufficient for the ice to fracture; remaining ice residue can be removed mechanically, which is energy-efficient.

In a particularly preferred embodiment of the device according to the invention, the deformation device comprises a first deformation unit on a first section of the surface region and a second deformation unit on a second surface region, which is separated from the first section by the heat emission line.

The deformation device preferably comprises a first deformation unit on a first side of a heat emission line of the heat emitting device, for deforming a first section of the surface region, which is located on the first side, and comprises a second deformation unit on the second side of the heat emission line for deforming a second section of the surface region, which is located on the second side.

In a particularly preferred embodiment, the device has a surface coating for the surface region, which reduces ice adhesion forces.

Preferably the heat emission device comprises, as the line-shaped heat source, at least one heating wire and/or at least one piezoelectric actuator, which is designed and set up to be capable of emitting heat along the shape of a line.

The heat source of the heat emitting device is preferably enclosed by an insulating jacket in order to prevent heat from radiating into the interior of the profile element and/or to generate a buildup of heat, by means of which heat can be introduced into the surface of the profile element along the shape of a line.

According to a further aspect, the invention involves an aerodynamic profile element for an aircraft, which comprises a device—according to the invention or the advantageous embodiments thereof—for de-icing and/or for preventing the formation of ice.

A preferred embodiment of the profile element is preferably characterized in that the heat emitting device is designed to emit heat along the shape of a line for the purpose of producing a predetermined breaking point or a predetermined breaking line along or near a stagnation line of the profile element and/or along a leading edge of the profile element.

In the case of the profile element, it is also preferable to provide a deformation device, by means of which the at least one part of a surface region of the profile element, which encloses the stagnation line and/or the leading edge of the profile element, can be deformed in order to remove ice.

Particularly preferably, the deformation device comprises the first deformation unit for deforming the first section and the second deformation unit for deforming the second section of the surface region, wherein the sections are preferably separated by the stagnation line and/or the leading edge of the profile element.

Preferably a surface region is provided, which encloses the stagnation line and/or the leading edge of the profile element and has a surface coating, which reduces ice adhesion forces.

The surface region is preferably provided with a nano-structured surface and/or a hydrophobic surface, in particular a super-hydrophobic surface.

According to a further aspect, an aircraft is provided that comprises a device according to the invention or the advantageous embodiments thereof or comprises an aerodynamic profile element according to the further aspect of the invention or the advantageous embodiments thereof.

According to a further aspect, the invention provides a method for de-icing a surface region of an aircraft and/or for preventing the formation of ice on the surface region of the aircraft by introducing thermal energy at the surface region, characterized by the introduction of heat along a line on the surface region in order to form a predetermined breaking line or a parting line in accumulating ice or in collections of water droplets accumulating on the surface region.

According to a further aspect, the invention provides a method for de-icing a surface region of an aircraft and/or for preventing the formation of ice on the surface region of the aircraft by introducing thermal energy at the surface region, characterized by the introduction of heat along a line on the surface region in order to form a predetermined breaking line or a parting line in accumulating ice or collections of water droplets accumulating on the surface region.

A preferred embodiment of the method further comprises the step of:

Deforming the surface region—in particular by means of piezoactuators—in order to fracture ice along the predetermined breaking line and/or to remove ice fractured along the predetermined breaking line and/or to remove accumulating water droplets.

A further preferred embodiment of the method comprises the step of:

Equipping or providing the surface region with a surface coating that reduces ice adhesion forces, and/or with a surface property that reduces ice adhesion forces.

Exemplary embodiments of the invention are designed to emit heat along a heat emission line at a surface region to be de-iced or to be maintained free of ice. Heat is preferably emitted along or in the vicinity of a stagnation line or stagnation point line. As a result thereof, and, in a particularly preferred embodiment, as a result of an insulating jacket of a heat source of a heat emitting device designed to emit heat along the shape of a line, a predetermined breaking line or a parting line can be created between collections of water droplets or ice accumulations that form nevertheless, with relatively little energy input. The ice accumulations that form on both sides of the heat emitting line can therefore be more easily removed.

Particularly preferably, the device is designed as a hybrid de-icing system. The device designed as a hybrid de-icing system makes possible a particularly energy-efficient de-icing of ice that has accumulated during flight.

In a preferred embodiment of the device, hybridization is achieved by
  a) targeted use of thermal energy—in particular by means of a heating wire, more particularly by a heating wire enclosed (nearly entirely, with the exception of an opening to form the heat emission line) by an insulating jacket, or by any other heat source that is suitable for emitting heat along the shape of a line—coupled with
  b) a deformation of the surface to be de-iced—preferably by means of one or more piezoelectric actuators and/or one or more inertial force generators or inertial mass oscillators—particularly preferably, furthermore, in combination with
  c) a surface coating that reduces ice adhesion forces, for example by means of a nanostructured, super-hydrophobic surface, for example by means of hydrobead.

In a particularly preferred embodiment, the device for de-icing and/or for preventing the formation of ice is formed by a hybrid system, which comprises a combination of three subsystems, namely an electro-thermal system, a mechanical system, and a surface coating. A combination of all three measures has proven to be particularly energy-efficient and has proven to be the most effective solution.

However, the combination of the line-shaped emission of heat with only one of the other subsystems—mechanical deformation or surface coating—also offers considerable energy advantages over known de-icing systems.

In addition, the use of the line-shaped emission of heat along a predefined heat emission line is interesting on its own for de-icing.

Particularly preferably, piezoactuators are provided for deforming the surface region for the purpose of mechanically removing accumulating ice.

Of particular interest is a combination of a heat emission device that emits heat along the shape of a line—for example, in particular, with the aid of a heating wire, which, in a particularly preferred design, is enclosed by an insulating jacket—with a corresponding surface deformation, for example by means of piezoactuators, in particular. Due to a combination of this type, the ice that is mechanically freed from the surface is not held against the surface by aerodynamic forces of the flow, but rather is entirely removed, in particular by means of a punctiform predetermined breaking point (according to a two-dimensional view), which is thermally introduced at the stagnation point, or by means of the line-shaped predetermined breaking point in the wingspan direction (according to a three-dimensional view), which is thermally introduced at the stagnation line.

Further advantages of the device according to the invention—in particular in an embodiment as a hybrid system—are smaller installation space and a reduction in the weight of the device.

In particular, when the device is structurally integrated into a profile element, for example a wing profile of an aircraft, no moving parts are present, and therefore a long service life can be expected.

Moreover, the use of a heating wire is preferred. This also has advantages in terms of a sensor system. A heating wire that is provided can also be used as a temperature sensor.

In addition, the formation of ice on the surface of the profile body, for example a wing profile, can also be detected by means of piezoelectric actuators, which are provided for deforming the surface, for example by shifting the resonant frequencies or by means of modified oscillation modes.

In this respect, the heating elements and actuators that are utilized can also be used as sensors. Additional sensors are therefore unnecessary, and even more weight can be saved.

BRIEF DESCRIPTION OF THE DRAWING FIGURES

Exemplary embodiments of the invention are explained in greater detail in the following with reference to the attached drawings. In the drawings.

DETAILED DESCRIPTION

A device 10 for de-icing and/or for preventing the formation of ice at a surface region 14 of an aircraft 16 is explained in greater detail in the following with reference to the depiction in FIGS. 1 and 2.

Figure 1:
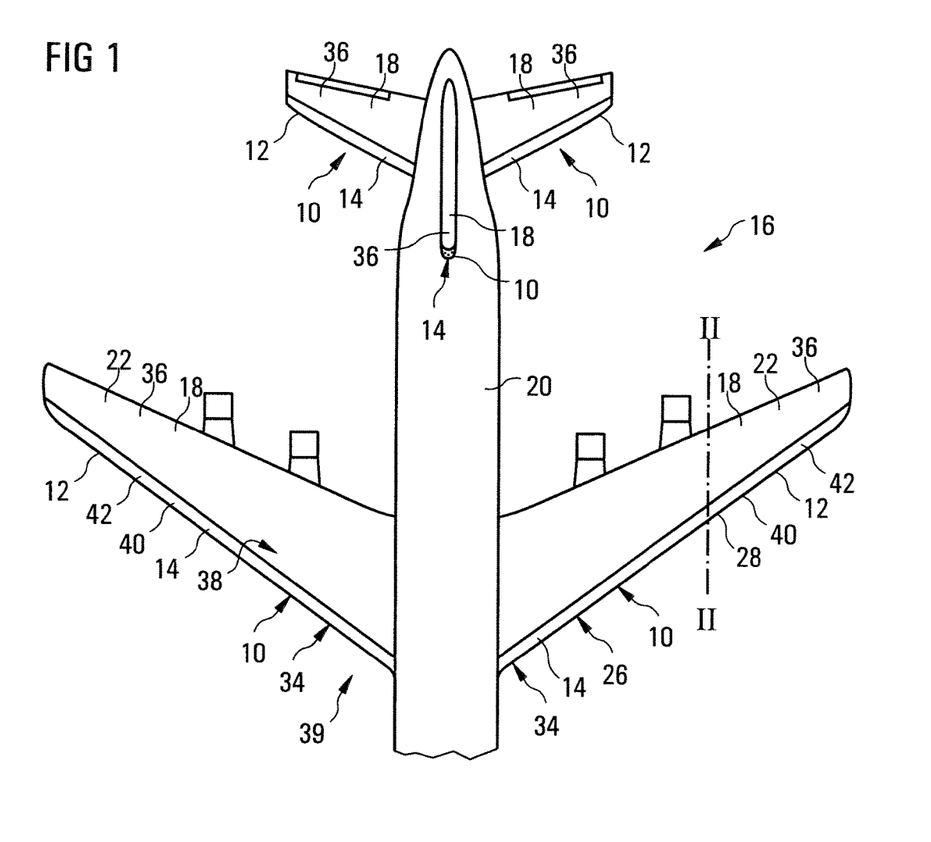
FIG. 1 shows a schematic, partially cut-away depiction of an aircraft using the example of an airplane, wherein the leading edges of aerodynamic profile elements of the aircraft, for example, in particular, airfoils and fins of the tail, are provided with a device for de-icing and/or for preventing the formation of ice.
Figure 2:
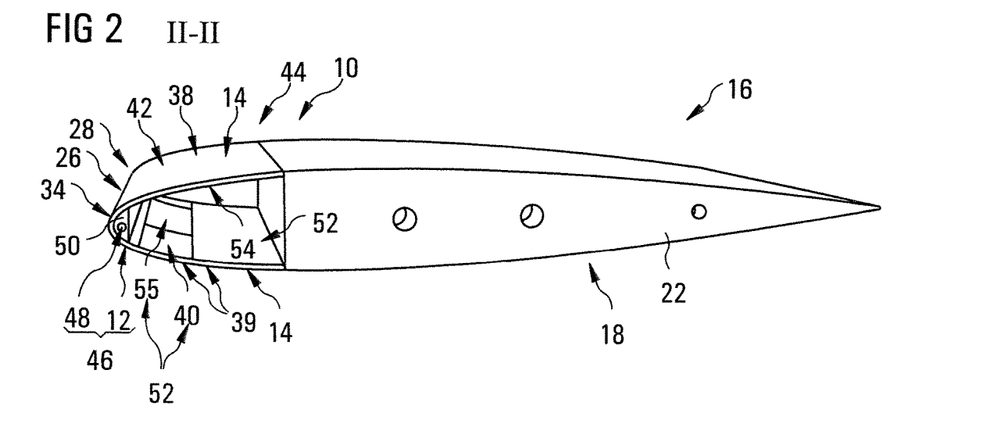
FIG. 2 shows a schematic, partially perspective, partially exposed depiction through an aerodynamic profile element, for example for forming an airfoil of the aircraft from FIG. 1, shown in the section along the line II-II from FIG. 1, wherein the profile element is provided with the device for de-icing and/or for preventing the formation of ice.

The depictions in FIGS. 1 and 2 are merely exemplary embodiments. Several other deviating embodiments of the device 10 are possible.

FIG. 1 shows an aircraft 16 in the form of an airplane 20. The airplane 20 comprises wings 22, tail fins 24, and engine intakes 25, all of which are formed by profile elements 18. The surface region 14 on which ice can accumulate during flight is located in the region around the leading edges 26 of the profile elements 18 of the wings 22 as well as the tail fins 24 and the engine intakes 25.

In order to counteract this, the aircraft 16 comprises a device 10 for de-icing and/or for preventing the formation of ice on the respective surface region 14. The device 10 comprises a heat emitting device 12 for emitting heat at the surface region 14.

In contrast to the prior art shown, for example, in FIGS. 6 and 7, the heat emitting device 12 is not designed to emit heat over a large surface area, but rather to emit heat in the shape of a line, along a heat emission line 28. By means of a line-shaped emission along the heat emission line 28, ice 30 accumulating on the surface region 14 can weaken along a line and can part along the heat emission line 28. In this respect, the heat emitting device 12 is designed to form a predetermined breaking point or a predetermined breaking line 32 for the ice 30.

Figure 3:
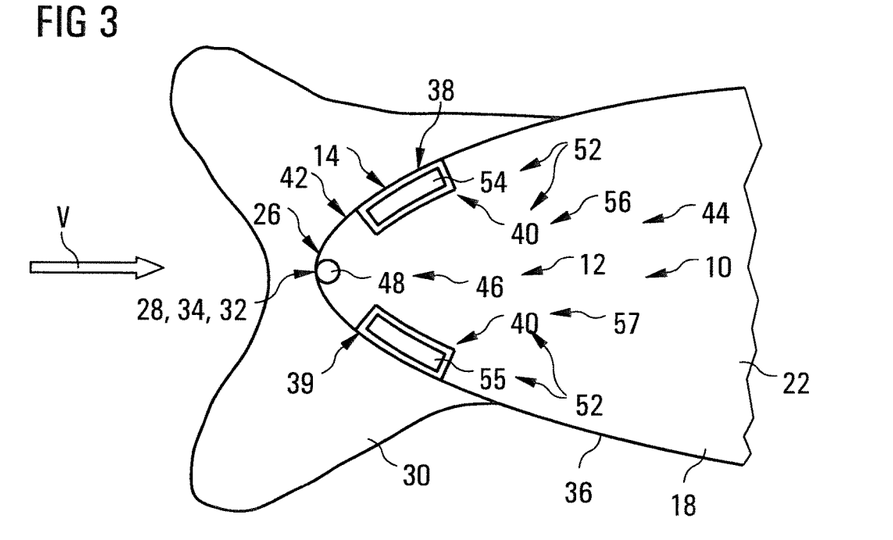
FIG. 3 shows, in a schematic exposed depiction, a section through the leading edge of the profile element from FIG. 2 comprising the device for de-icing and/or for preventing the formation of ice, without operation of a heat emitting device.
Figure 4:
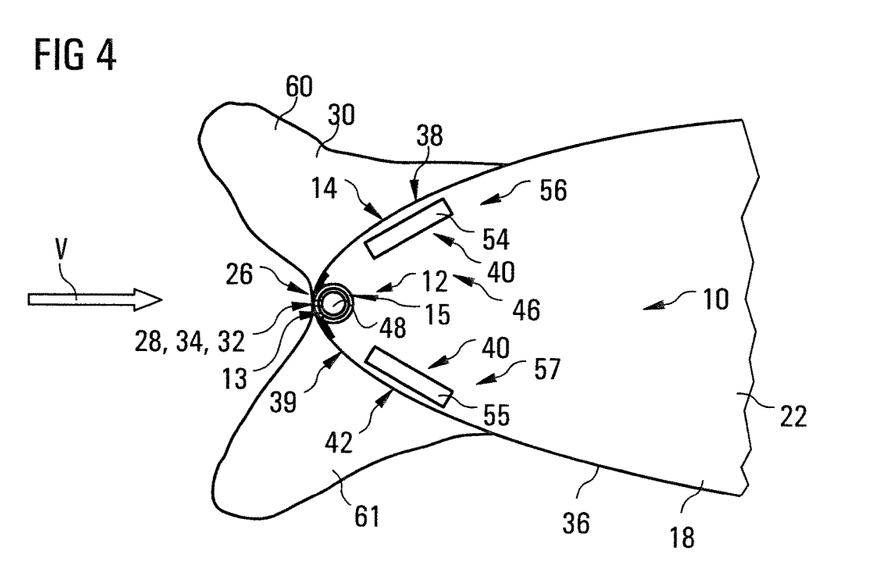
FIG. 4 shows a depiction as in FIG. 3, with operation of the heat emitting device.

In a preferred embodiment, the heat emitting device 12 is designed such that the heat is emitted in the shape of a line along the outermost leading edge 26 and, in particular, along the stagnation line 34 of the respective aerodynamic profile 36 of the respective profile element 18. The stagnation line 34 is the line that connects the stagnation points of the aerodynamic profile 36 to one another or, in other words, it is the line on an aerodynamic profile 36 at which a suitable incoming air stream—which is depicted in FIGS. 3 and 4 by the arrow and the velocity vector v—is split into flows toward the two sides as well as upward and downward. During flight, the highest pressure forms along the stagnation line 34.

Figure 5:
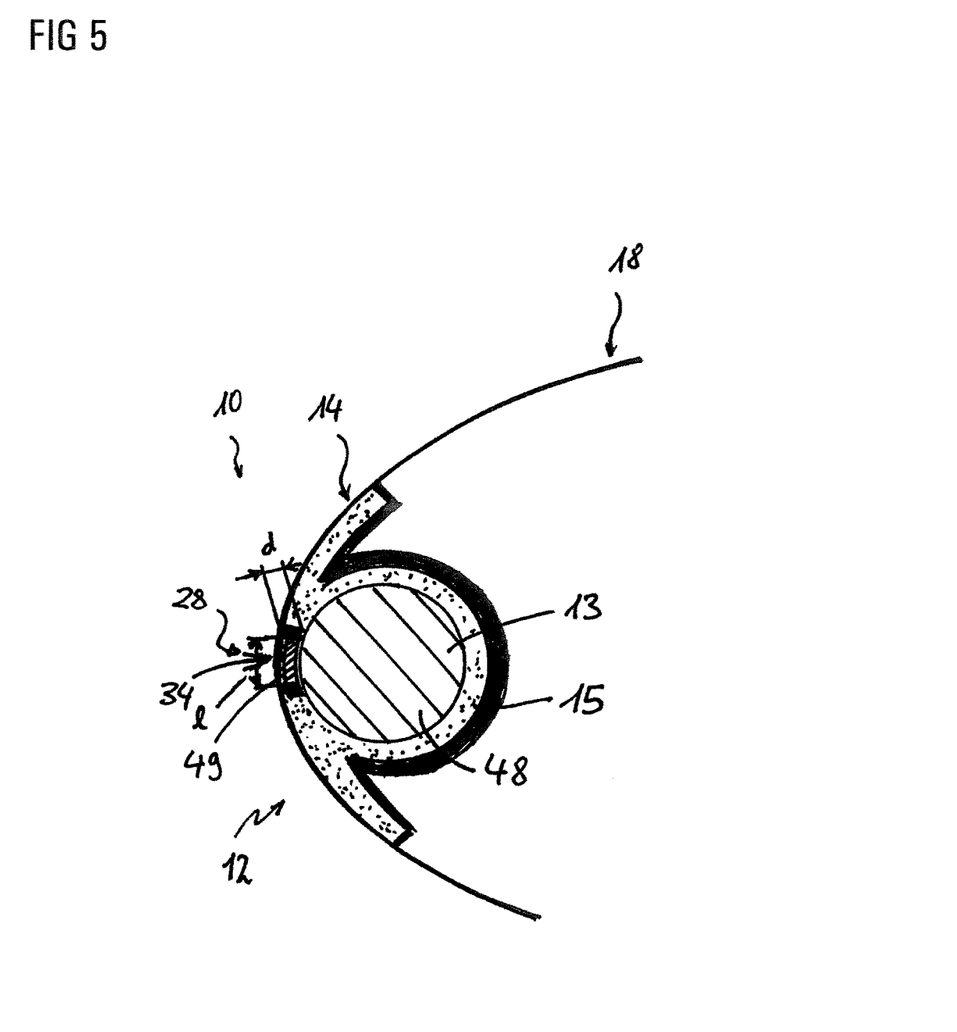
FIG. 5 shows a detailed cut-out of FIG. 3 or, in particular, FIG. 4, during operation of the heat emitting device, which is enclosed by an insulating jacket in order to prevent the emission of heat into the interior of the profile element and, in particular, to generate a buildup of heat inside the jacket for the targeted emission of heat into the surface of the profile element, wherein said heat emission can be introduced in the shape of a line.

In a preferred embodiment, as illustrated in FIG. 5, the heat emitting device 12 comprises an elongated heat source 13. In a further preferred embodiment, the heat source 13 is enclosed by an insulating jacket 15, which prevents the emission of heat into the interior of the profile element 18 and generates a buildup of heat inside the insulating jacket 15, thereby permitting the heat emission to be introduced into the surface of the profile element 18 in a targeted manner, in the shape of a line.

The device 10 further comprises devices for removing ice and/or for preventing an accumulation of ice in or at the sections 38, 39 of the surface region 14 that are separated by the heat emission line 28 or the stagnation line 34.

In one possible embodiment, a deformation device 40 is provided for deforming corresponding parts or sections 38, 39 of the surface region 14.

In another possible embodiment, a surface coating 42 for reducing ice adhesion forces is provided at the surface region 14.

Particularly preferably, both the deformation device 40 as well as the surface coating 42 which reduces the ice adhesion forces are provided, as is the case with the embodiment shown in FIG. 2.

According to a preferred embodiment, the device 10 is designed as a hybrid de-icing system 44, which removes ice or prevents the formation of ice by employing at least two principles.

The heat emission device 12 is preferably formed by an electro-thermal system 46, which is formed as a subsystem of the hybrid de-icing system 44.

In a preferred embodiment, the heat emitting device 12 comprises a heating wire 48 as the heat source 13 for the defined formation of a predetermined breaking point at the stagnation line 34 of the profile 36.

As shown in FIG. 2 in particular, to this end, the electro-thermal heating wire 48 is installed along the stagnation line 34 of the profile 36 in order to construct the device 10 in the region of the leading edge 26 of the profile element 18, which is used, for example, to form the wing 22 or to form tail fins 24. In a preferred embodiment, the heating wire 48 is embedded in a matrix made of fastening material, in particular such as an epoxy resin matrix 50. Instead of the use of an embedding matrix, the heating wire 48 can also be fastened with a thin adhesive film on the inner side of the profile 36. A single-wire jacket heating conductor having a narrow, circular cross-section is used as the preferred heating wire 48. As an alternative, a carbon fiber cord (not illustrated) can be used as the heating element. This can be impregnated with epoxy resin, for example, and can be wrapped in glass layers, for example, for electrical insulation.

As shown in FIG. 5 in particular, the heating wire 48 is enclosed by an insulating jacket 15. In a preferred embodiment, the insulating jacket 15 is made of an insulating material and, in an explicitly preferred design, the jacket is made of Kapton. An opening in the insulating jacket is formed only in the region of the bonding—adhesive bond 49—which connects the heating wire 48 to the inner side of the surface of the profile element in a materially-bonded manner.

The insulating jacket 15 therefore encloses the heat source 13 around its entire circumference except for the narrow region where the heat source 13 is preferably connected in a materially-bonded manner to the inner side of the profile element 18. In this connection region, the insulating jacket is left open in the shape of a slot.

As is further shown in FIG. 5, in a preferred design, the adhesive bond 49 has a length 1 around the stagnation point—stagnation line 34—of the profile element 18 in a range between 0.5 mm and 1.5 mm, and, in an explicitly good design, a length of approximately 0.8 mm. In a preferred design, the thickness d of the adhesive bond 49 is 0.2 mm.

The line-shaped heat emission region—heat emission line 28—is defined and delineated by means of the opening of the insulating jacket 15 and the adhesive bond provided there. It is thereby possible to obtain heat emission that is limited to a very narrow range of less than 5 mm, preferably between 0.2 mm and 4 mm, more preferably between 0.5 mm and 1.5 mm, and most preferably of approximately 0.8 mm to approximately 1.0 mm.

Instead of the heating wire 48, the heat emitting device 12 can also use a piezoactuator, which is activated with high frequency, for example, and therefore emits thermal energy as well as mechanical energy. Such a piezoactuator of the further embodiment without a heating wire 48, which is not illustrated in greater detail here, should be designed such that it emits heat along the heat emission line 28 such that a predetermined breaking point is formed. In this case as well, a defined heat emission is limited to a heat emission line having the aforementioned preferred width (corresponding to length 1 of the adhesive bond 49).

In a further preferred embodiment, the device 10 also comprises, in addition to the heat emitting device 12, an electro-mechanical de-icing system 52 as a further subsystem of the hybrid de-icing system 44. The electromechanical de-icing system 52 can be considered to be an example of the deformation device 40. The electromechanical de-icing system 52 preferably comprises at least one piezoactuator 54.

Particularly preferably, the deformation device 40 and its electromechanical de-icing system 52 comprise a first deformation unit 56 and a second deformation unit 57. The first deformation unit 56 is used to deform a first section 38 of the surface region 14 on a first side of the heat emission line 28. In the example depicted in FIG. 2, where the profile element 18 is part of the wing 22, the first section 38, for example, is the section of the surface region 14 enclosing the leading edge 26 that is located above the stagnation line 34. Accordingly, in the example depicted, the second section 39, which will be deformed by the second deformation unit 57, would be the section of the leading-edge surface region 14 that is below the stagnation line 34.

Accordingly, the electromechanical de-icing system 52 preferably comprises at least two piezoactuators 54, 55, namely at least one first piezoactuator 54 for the first deformation unit 56 and at least one second piezoactuator 55 for the second deformation unit 57.

In order to construct an electromechanical de-icing system 52, for example, at least two piezoactuators 54, 55 are installed in the region of a leading edge 26 of an aerodynamic profile 36, for example the profile element 18 of a wing 22, a tail fin or an engine intake 25. The piezoactuators 54, 55 are located, in the direction of flow, downstream of the line-shaped heat emitting region, which is defined by the heating wire 48. The piezoactuators are therefore used to remove, by means of the electro-thermal system 46, ice accumulations downstream of the stagnation point of the profile 36 and ice deposits comprising droplets that are flowing back and solidifying.

The piezoactuators 54, 55 can be, in particular, $D_{33}$ actuators having, e.g. a length of approximately 30 mm, a width of approximately 10 mm and a height of approximately 2 mm. Reference is expressly made to PCT patent document WO 2007/071231 A1 for further details related to the design and a possible arrangement of the piezoactuators.

In order to ensure that the mechanical coupling into the structure is as efficient as possible, flat surfaces are provided for the preferable, e.g. cuboid piezoactuators 54, 55 for the application onto the inner side of the profile 36. The preferable, cuboid piezoactuators 54, 55 are advantageous, in particular, because they can be obtained as standard components at low cost. As an alternative, piezoactuators having an adapted shape can be provided, which have the same curved contour as the profile 36, in order to ensure that the mechanical coupling into the structure is as efficient as possible.

The device 10 for de-icing and/or for preventing the formation of ice also comprises, in the preferred embodiment as a hybrid de-icing system 44, a device for preventing ice from adhering on the surface region 14. This device can be considered to be a further subsystem for de-icing. In particular, this device has the surface coating 42.

In a preferred embodiment, the surface region 14 around the leading edge 26 of the aerodynamic profile 36 or, for example, an entire surface region of the profile element 18—for example, the wing 22—is coated and/or structured such that the surface has minimal properties of adhesion between ice (or water) and the profile surface. The profile element 18 that is provided is, for example, an NACA-0012 aluminum wing profile having a nanostructured, superhydrophobic surface structure or surface coating 42 in the region of the leading edge 26 (e.g., hydrobead).

For example, the following method is used to adapt an ultra-smooth surface having a nanostructured, hydrophobic morphology, which can be subdivided into three steps:
1) polishing a structure formed of an aluminum alloy until it is smooth as a mirror
2) forming a nanoporous aluminum oxide layer by means of phosphoric acid/sulphuric acid anodizing (PSA) and
3) surface hydrophobization.

In step 1), the aluminum alloy surfaces are polished until they form an ultra-smooth mirror surface. The PSA method is carried out, for example, with voltages in the range of 16 to 26 volts and at temperatures between 18 and 35° C. In step 3), the peaks of the nanoporous aluminum oxide surface that were left by the anodizing are treated with a hydrophobization agent. Industrially available means are used here, for example, such as the "Episurf" solution from Surfactis Technologies in the dipping method, or chemicals such as, for example, trichloro(1H,1H,2H,2H-perfluorooctyl)silane from Sigma Aldrich, which, in a preferred embodiment, is deposited onto the polished, nanostructured aluminum surface by means of an evaporation process in a dessicator. The method for the production and use of a polished, nanostructured metallic surface having water- and ice-repellent properties is specified in the patent application P700750-DE-NP.

FIG. 2 shows the preferred embodiment of the device 10 comprising the heat emitting device 12—as the electrothermal system 46—which has been provided with the heating wire 48 along the stagnation line 34, the device 10 also comprising the deformation device 40—as the electromechanical de-icing system 52—which is formed with first and second deformation units 56, 57 formed with piezoactuators 54, 55 for deforming a first section and a second section 38, 39 of the surface region 14, and comprising the surface coating 42 as a further subsystem of the hybrid de-icing system 44.

A mode of operation of such a hybrid de-icing system 44 is explained in greater detail in the following by reference to depictions in FIGS. 3 and 4.

FIG. 3 shows the schematic diagram of the aerodynamic profile 36 using the example of the profile of the wing 22 having a leading edge 26 covered entirely with ice 30. The indicated heating wire 48, which is adhesively bonded on the inner side of the profile 36 at the level of the stagnation line 34, was never electro-thermally heated in this example. Even if a bond in the boundary layer between the ice and the surface is fractured in the surface region 14 of the profile 36 via activation of the indicated piezoelectric actuators 54, 55, the ice layer enclosing the leading edge 26 of the profile 36 continues to remains at the same location, because the aerodynamic forces of flow—as depicted by the velocity vector v—continue to hold the ice layer against the leading edge 26 of the profile 36.

In contrast, FIG. 4 shows a schematic diagram of the profile 36 of the profile element 18, which forms the wing 22, for example, comprising a heating wire 48, which is operated permanently, for example, and which is adhesively bonded on the inner side of the profile 36 at the level of the stagnation line 34. The introduction of thermal energy in a punctiform manner, as viewed in two dimensions, and in a line-shaped manner, as viewed in three dimensions, generates a predetermined breaking point or a predetermined breaking line 32, respectively, which partitions or splits the accumulations of ice 30 at the stagnation line 34 of the profile 36 of the wing 22 into an upper portion 60 and into a lower portion 61 of the ice layer. As viewed in general, the ice 30 is segmented along the predetermined breaking line 32 into a first portion 60 and into a second portion 61. The two ice portions 60, 61 can therefore be removed by the indicated piezoelectric actuators 54, 55.

As shown in FIGS. 4 and 5, the heat emitting device 12 comprises the elongated heat source 13, such as the heating wire 48, for example, and an insulating jacket for the heat source 13. The heat source 13 is enclosed by the insulating jacket 15, thereby preventing heat emission outside of the heat emission line 28. In particular, heat emission into the interior of the profile element 18 is prevented and, in addition, a buildup of heat inside the insulating jacket is generated. The emitted heat can therefore be introduced into the surface of the profile element 18 in a targeted manner. Substantially all the thermal energy is emitted along the shape of a line at the heat emission line 28 in order to thereby produce the predetermined breaking point or the predetermined breaking line 32 and to segment the ice 30. As a result, only a very small quantity of thermal energy is required.

In this connection, it is sufficient if the ice 30 is split in a range between 0.5 mm and 1.5 mm. In a particularly preferred embodiment, a split occurs along a predetermined breaking line 32 having a line width of approximately 1 mm. The two portions of ice, which have been split, can then be mechanically removed by deforming the surface of the profile element 18.

The mode of operation of the hybrid de-icing system 44 illustrated with reference to FIGS. 3 and 4 will be explained in greater detail in the following using the example of one possible embodiment of a method for de-icing or for preventing the formation of ice on aircraft, which can be carried out using the device 10, for example.

Thermal energy is transferred to the profile 36 along the shape of a line in the wingspan direction by the use of a heating wire 48, for example, at the stagnation line 34 of the profile 36 of a wing 22, a fin, an engine intake, or the like, wherein the heating wire 48 is adhesively bonded onto the inner side of the profile 36. More generally, heat is emitted from a heat emitting device 12 along the shape of a line, as viewed in three dimensions, or in a punctiform manner, as viewed in two dimensions, as depicted in FIG. 4. This causes the layer of ice 30 enclosing the leading edge 26 to fracture and can be considered to be an intentional introduction of a predetermined breaking point or a predetermined breaking line 32, which partitions the ice accumulation into a first half of the ice and a second half of the ice, for example into an upper half of the ice and a lower half of the ice.

Of particular advantage is the use of a heating wire 48 to form the hybrid de-icing system 44 in combination with a deformation of a surface region 14 of the profile 36 by means of piezoelectric actuators 54, 55.

If the use of heating wire 48 is omitted, the piezoactuators 54, 55 are capable of deforming the surface of the profile 36 of the wing 22 and, therefore, of fracturing the bond in the boundary layer of the ice and the surface. However, the ice 30 that is detached from the surface continues to be held against the profile 36 of the wing 22 due to the aerodynamic stagnation pressure of the incoming air stream. The surface region 14 is therefore not fully freed from ice accumulation—see FIG. 3. Due to the partitioning into a plurality of sections or portions 60, 61, for example an upper half of the ice and a lower half of the ice, by means of the heat emitting device 12, for example by means of the heating wire 48, one possible problem of the ice 30 being held against the profile 36 is circumvented—see FIG. 4—and one can additionally make use of the effect of the aerodynamic incoming air stream of the profile 36 and the forces acting on the ice 30 as a result.

In contrast to electro-thermal systems or heat emitting devices 102 that function using heating mats 110, the heating wire 48 is used not only for the thermal removal of large areas of ice accumulations on the aerodynamic profile 36, for example the wing 22, but is also used to fracture the ice layer along the shape of a line.

A method for de-icing a surface region 14 of an aircraft 16 and/or for preventing the formation of ice on the surface region 14 of the aircraft 16, which can be carried out with the device 10, for example, therefore has the step of introducing heat along a line at the surface region 14 in order to form a predetermined breaking line 32 in ice 30 accumulating on the surface region 14 or forming a parting line in ice accumulating on the surface region or in collections of water droplets accumulating on the surface region.

By skillfully utilizing the incoming air stream, ice may therefore be removed by fracturing the ice along a predetermined breaking line.

More preferably, heat is introduced along a heat emission line 28 in order to form a predetermined breaking line 32 or a parting line along a stagnation line 34 of an aerodynamic profile 36.

More preferably, the method further comprises at least one of the steps of deforming the surface region 14, in order to fracture ice along the predetermined breaking line 32 and/or in order to remove ice that has been fractured along the predetermined breaking line 32 or in order to remove collections of water that have accumulated on the sides of the parting line, and/or to provide a surface region 14 with a surface property that reduces ice adhesion forces, in particular by means of a corresponding surface coating 42.

In a preferred embodiment, the heating wire 48 of the electro-thermal system 46 is operated in a permanent running-wet anti-icing mode. In order to reduce energy consumption, the heating wire can also be operated, as an alternative, in the cyclic de-icing mode in order to enable portions 60, 61 of ice 30 that have been separated from one another to be removed from the profile 36 by means of the deformation device 40.

The deformation of the surface region 14 is preferably implemented by piezoactuators 54, 55. In particular, the deformation of the surface of the profile 36 is implemented by activating the piezoactuators 54, 55 in the range of the resonant frequency of the structure—in this case, a low control voltage at a set voltage of 0 V is preferably used—or by means of a quasi-static excitation of the piezoactuators— in this case, a high amplitude at a set voltage >0 is preferably used—, whereby the ice accumulations are removed in the region of the flow direction downstream of the stagnation line 34 of the profile 36.

A further possible activation involves a continuous, dynamic activation of the piezoelectric actuators 54, 55 with a square-wave signal having a defined edge steepness at a repeat frequency of, for example 1 Hz. The square-wave signal causes the wing structure to resonate; this effect, in addition to the static deflection, has a positive effect on the bursting of the ice 30.

If two or more piezoactuators 54, 55, for example, are installed on the first and second sections 38, 39 of the profile 36 in each case—for example, on the top side and the underside of the profile 36 of the wing 22—it is furthermore possible to activate the actuators 54, 55 individually in order to generate an arbitrary mode of oscillation on the surface of the profile 36, for example a type of wave transverse to the surface of the surface region 14.

The piezoactuators 54, 55 can move in the wingspan direction or in the direction of flight (D33 effect) or in a planar manner (D31 effect).

In an alternative embodiment, which is not depicted in greater detail, the deformation resonance can also be implemented by the use of an inertial force generator or an inertial mass oscillator. Examples of inertial force generators or inertial mass oscillators that can be used for this purpose are described in patent documents WO 2007073820A1, EP 1963704B1, EP 0907036A2, US 20050285477A1, US 20080316671A1, US 20050280332A1, U.S. Pat. No. 6,411,009B2 and, in particular, in the German patent application DE 10 2014 110 753.5, to which reference is expressly made with regard to further details. It is also possible to provide combinations of at least one piezoelectric actuator and at least one inertial force generator and/or inertial mass oscillator.

Due to the ice-repellent properties of a super-hydrophobic coating 42, the adhesive binding forces between ice 30 and the surface of the profile 36 are reduced to a minimum. It is thereby possible to remove all ice accumulations on the profile 36 in an energy-efficient manner.

In order to demonstrate functionality, a profile 36 of the wing 22 was de-iced under real flight conditions in an icing wind tunnel on a laboratory scale. All ice accumulations adhering on the wing profile were removed by the use of all three subsystems of the hybrid de-icing system 44. The three subsystems were used simultaneously in this case. A comparison of the energy demand of the hybrid de-icing system 44 with a de-icing system that has already been certified for flight operation—in particular a purely electro-thermal de-icing system 116 of the type shown in FIGS. 6 and 7—showed a very clear reduction in energy usage.

As described in the initially mentioned document [1], the value of the consumed power is decisively determined not only by the surface on which the ice accretion is intended to be prevented by means of a thermal system, but also by the temperature of the airflow.

For the thermal subsystem, which was implemented in a preferred embodiment by a circular heating wire having a diameter of 1.2 mm, the range of the power consumed by the heating wire was determined as a function of the temperature.

In order to produce an ice-free line having a width of 1 mm in a velocity range between 90 m/s and 120 m/s, the thermal system consumed power per wingspan in the range between 18.5 W/m and 29.4 W/m. These power data for preventing the accretion of ice at the stagnation line are based on the formation of clear ice, which forms in the temperature range slightly below the freezing point of water.

At air temperatures that favor the formation of raw ice, the thermal output of the heat emitting device was determined span-wise in a power range between 209.1 and 452.4 W/m.

In the comparison of the de-icing along the shape of a line using the heat emitting device (e.g., heating wire) described herein with a thermal subsystem [2] from the literature that provides for a planar removal of ice or a planar dissolution of ice on the surface of a profile element, it is clear that de-icing along the shape of a line using the heating wire requires 95% less thermal output as compared to planar de-icing.

Likewise, a power range can be stated for the power consumed by the mechanical deformation unit, which, in a preferred design, comprises piezoelectric actuators; in contrast to the thermal output range, the power range can be considered to be independent of temperature. Power is consumed per wingspan in a range between 28.6 W/m and 38.1 W/m in order to remove the accreted ice in the region downstream of the ice-free line by means of the actuators.

Moreover, it has been shown that the use of the ice-repellent surface layer can reduce the minimal ice thickness that can be removed by the use of the mechanical deformation unit, wherein the minimum ice thickness that can be removed can be considered to be a decisive design criterion for mechanical de-icing systems. Without the coating, mean ice thicknesses of 2.67 mm and, highly preferably, ice thicknesses having a minimum value of 1.85 mm can be removed by the use of the mechanical deformation unit.

If the mechanical deformation unit is supported by the ice-repellent surface layer (or a corresponding surface structuring), wherein the ice-repellent surface layer reduces the adhesion of ice on the surface of the profile element, it is possible to remove mean ice thicknesses of 2.03 mm, and in an explicitly preferred embodiment, minimum ice thicknesses of 1.45 mm can be removed.

The use of the ice-repellent surface layer therefore makes it possible once more to reduce energy consumption by more than 21% as compared to the minimum ice thicknesses that can be removed, and to reduce energy consumption by approximately 24% as compared to the mean ice thicknesses that can be removed.

Exemplary embodiments of a device 10 and a method for de-icing and/or for preventing the formation of ice on a surface region 14 of an aircraft 16 were described in greater detail in the preceding. The invention is not limited to the individual exemplary embodiments that were depicted, of course. A plurality of modifications can be implemented. In particular, the three subsystems can also be used individually or in any combination with one another.

Further exemplary embodiments are possible and conceivable.

Some exemplary embodiments relate to a reduction in the likelihood of failure.

For example, the heat emitting device 12 could comprise a plurality of heating wires 48 in order to ensure the redundancy of a hybrid de-icing system 44.

For example, a heating wire 48 could be provided directly at the stagnation line 34 and further heating wires (which are not depicted in greater detail) could be disposed in the region around the stagnation line 34.

In addition, a plurality of piezoactuators 54, 55 can be used on each of the sections 38, 39.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE CHARACTERS 10 device for de-icing and/or for preventing the formation of ice
12 heat emitting device
13 heat source
14 surface region
15 insulating jacket
16 aircraft
18 profile element
20 airplane
22 wing
24 tail fins
25 engine intake
26 leading edge
28 heat emission line
30 ice
32 predetermined breaking line
34 stagnation line
36 aerodynamic profile
38 first section
39 second section
40 deformation direction
42 surface coating
44 hybrid de-icing system
46 electro-thermal system
48 heating wire
49 adhesive bond
50 epoxy resin matrix
52 electro-mechanical de-icing system
54 first piezoactuator
55 second piezoactuator
56 first deformation unit
57 second deformation unit
60 first portion of the ice layer
61 second portion of the ice layer
100 device for de-icing and/or for preventing the formation of ice
102 heat emitting device
104 surface region
106 aircraft
108 profile element
110 heating mat
112 leading edge
114 stagnation line
116 electro-thermal de-icing system
118 ice

What is claimed is:

1. A device for de-icing or for preventing ice formation for an aircraft, comprising:
a heat emitting device configured to emit heat at a surface region of the aircraft,
wherein the heat emitting device comprises at least one elongated heat source and a heat insulating jacket covering the heat source except at a linear opening that is substantially narrower than the width of the heat source, the heat insulating jacket directing the emitted heat through the linear opening only, thereby defining a line-shaped heat emission region corresponding to the linear opening, the line shaped heat emission region delineating a predetermined breaking point or a predetermined breaking line in ice accumulating along the line-shaped heat emission region on the surface region,
wherein the line-shaped heat emission region is a heat emission line having a width of no more than 5 mm; and
a deformation device, comprising a first deformation unit on a first adjacent unheated side of the heat emission line, that deforms a first section of the surface region located on the first adjacent unheated side, and a second deformation unit, on a second adjacent unheated side of the heat emission line, that deforms a second section of the surface region located on the second adjacent unheated side.

2. The device of claim 1, wherein the device further comprises an ice detection device configured to detect an accumulation of ice based on information received by the heat emitting device or by at least one actuator.

3. The device of claim 1, wherein the surface region comprising:
a surface structuring configured to reduce ice adhesion forces; or
a surface coating on the surface region.

4. The device of claim 1, wherein the heat emission device comprises at least one heating wire or at least one piezo-electric actuator that is configured to emit heat along the line-shaped heat emission region.

5. A profile element for an aircraft, comprising:
a device configured to at least one of de-ice and prevent the formation of ice, which comprises:
a heat emitting device configured to emit heat at a surface region of the aircraft,
wherein the heat emitting device comprises at least one elongated heat source and a heat insulating jacket covering the heat source except at a linear opening that is substantially narrower than the width of the heat source, the heat insulating jacket directing the emitted heat through the linear opening only, thereby defining a line-shaped heat emission region corresponding to the linear opening, the line shaped heat emission region delineating a predetermined breaking point or a predetermined breaking line in ice accumulating along the line-shaped heat emission region on the surface region,
wherein the line-shaped heat emission region is a heat emission line having a width of no more than 5 mm; and
a deformation device comprising a first deformation unit, on a first adjacent unheated side of the heat emission line, that deforms a first section of the surface region located on the first adjacent unheated side, and a second deformation unit, on a second adjacent unheated side of the heat emission line, that deforms a second section of the surface region located on the second adjacent unheated side.

6. The profile element of claim 5, wherein
a) the heat emitting device is configured to produce the predetermined breaking point or the predetermined breaking line along or near a stagnation line of the profile element or along a leading edge of the profile element, or
b) the device further comprises a deformation device configured so that the at least one part of a surface region of the profile element, which encloses the stagnation line or the leading edge of the profile element, is deformable in order to remove ice or water accumulations.

7. The profile element of claim 6, further comprising:
a surface region, which encloses the stagnation line or the leading edge of the profile element, has a surface coating, and which reduces ice adhesion forces.

8. The profile element of claim 7, wherein the surface region includes a nano structured surface or a super-hydrophobic surface.

9. An aircraft comprising:
a profile element, which comprises
a device configured to at least one of de-ice and prevent the formation of ice, which comprises
a heat emitting device configured to emit heat at a surface region of the aircraft,
wherein the heat emitting device comprises at least one elongated heat source and a heat insulating jacket covering the heat source except at a linear opening that is substantially narrower than the width of the heat source, the heat insulating jacket directing the emitted heat through the linear opening only, thereby defining a line-shaped heat emission region corresponding to the linear opening, the line shaped heat emission region delineating a predetermined breaking point or a predetermined breaking line-in ice accumulating along the line-shaped heat emission region on the surface region,
wherein the line-shaped heat emission region is a heat emission line having a width of no more than 5 mm; and
a deformation device comprising a first deformation unit on a first adjacent unheated side of the heat emission line, configured to deform a first section of the surface region located on the first adjacent unheated side, and a second deformation unit on a second adjacent unheated side of the heat emission line, configured to deform a second section of the surface region located on the second adjacent unheated side.

10. A method for de-icing a surface region of an aircraft or for preventing formation of ice on the surface region of the aircraft, the method comprising:
introducing, by at least one elongated heat source covered by a heat insulating jacket surrounding an entire circumference of the heat source except at a linear opening that is substantially narrower than the width of the heat source, the heat insulating jacket directing the emitted heat through the linear opening only, thereby defining a line-shaped heat emission region corresponding to the linear opening, the line shaped heat emission region delineating a predetermined breaking line in ice accumulating along the line-shaped heat emission region on the surface region or in collections of water droplets accumulating on the surface region, wherein the line-shaped heat emission region is a heat emission line having a width of no more than 5 mm,
deforming a first section of the surface region using a first deformation unit arranged on a first adjacent unheated side of the heat emission line; and
deforming a second section of the surface region using a second deformation unit arranged on a second adjacent unheated side of the heat emission line.

11. The method of claim 10, further comprising at least one of the steps of:
a) deforming the surface region using piezoactuators to at least one of (i) fracture ice along the predetermined breaking line, (ii) remove ice fractured along the predetermined breaking line, and (iii) remove water droplets, and
b) equipping or providing the surface region with a surface coating that reduces ice adhesion forces, or with a surface property that reduces ice adhesion forces.

12. The device of claim 1, wherein the deformation device comprises at least one piezoelectric actuator that is a $d_{33}$ stack actuator, an extension direction of which is oriented in a wingspan direction.

13. The device of claim 1, wherein the surface region comprises a super-hydrophobic surface.

14. The profile element of claim 5, wherein the surface region comprises a super-hydrophobic surface.

15. The aircraft of claim 9, wherein the surface region comprises a super-hydrophobic surface.

16. The method of claim 10, wherein the surface region comprises a super-hydrophobic surface.

17. The device of claim 1, wherein the insulating jacket encloses the heat source around an entire circumference of the heat source except along the line-shaped heat emission region.

18. The profile element of claim 5, wherein the insulating jacket encloses the heat source around an entire circumference of the heat source except along the line-shaped heat emission region.

19. The aircraft of claim 9, wherein the insulating jacket encloses the heat source around an entire circumference of the heat source except along the line-shaped heat emission region.

* * * * *